June 12, 1956 — O. E. HINTZ ET AL — 2,750,059
TWO-WAY SELF-UNLOADING VEHICLE
Filed Dec. 15, 1953 — 3 Sheets-Sheet 1

INVENTORS
OTTO E. HINTZ
EDWIN F. HUDDLE
JOHN H. BING
ATTORNEY

June 12, 1956 O. E. HINTZ ET AL 2,750,059
TWO-WAY SELF-UNLOADING VEHICLE
Filed Dec. 15, 1953 3 Sheets-Sheet 2
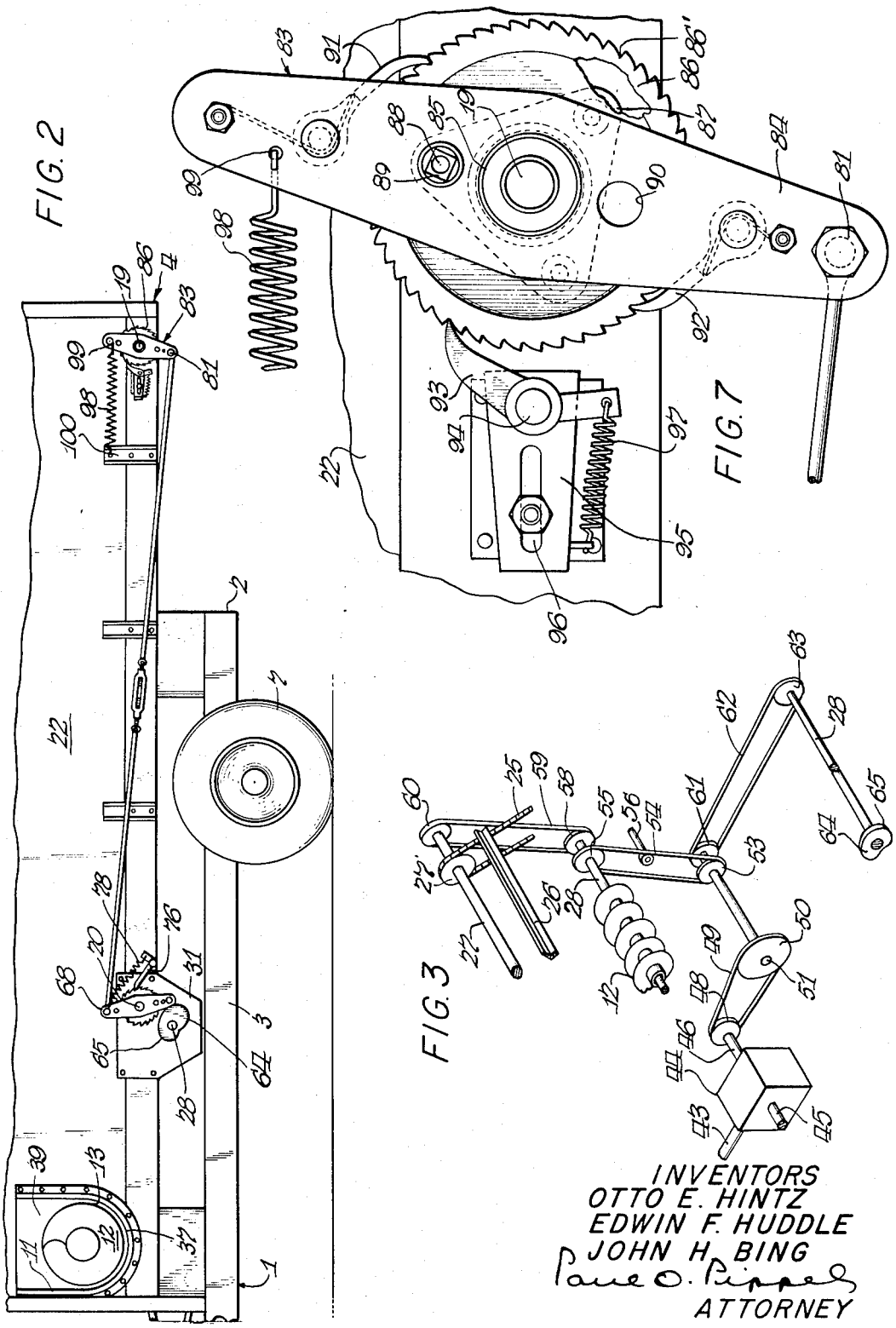
INVENTORS
OTTO E. HINTZ
EDWIN F. HUDDLE
JOHN H. BING
Paul O. Pippel
ATTORNEY

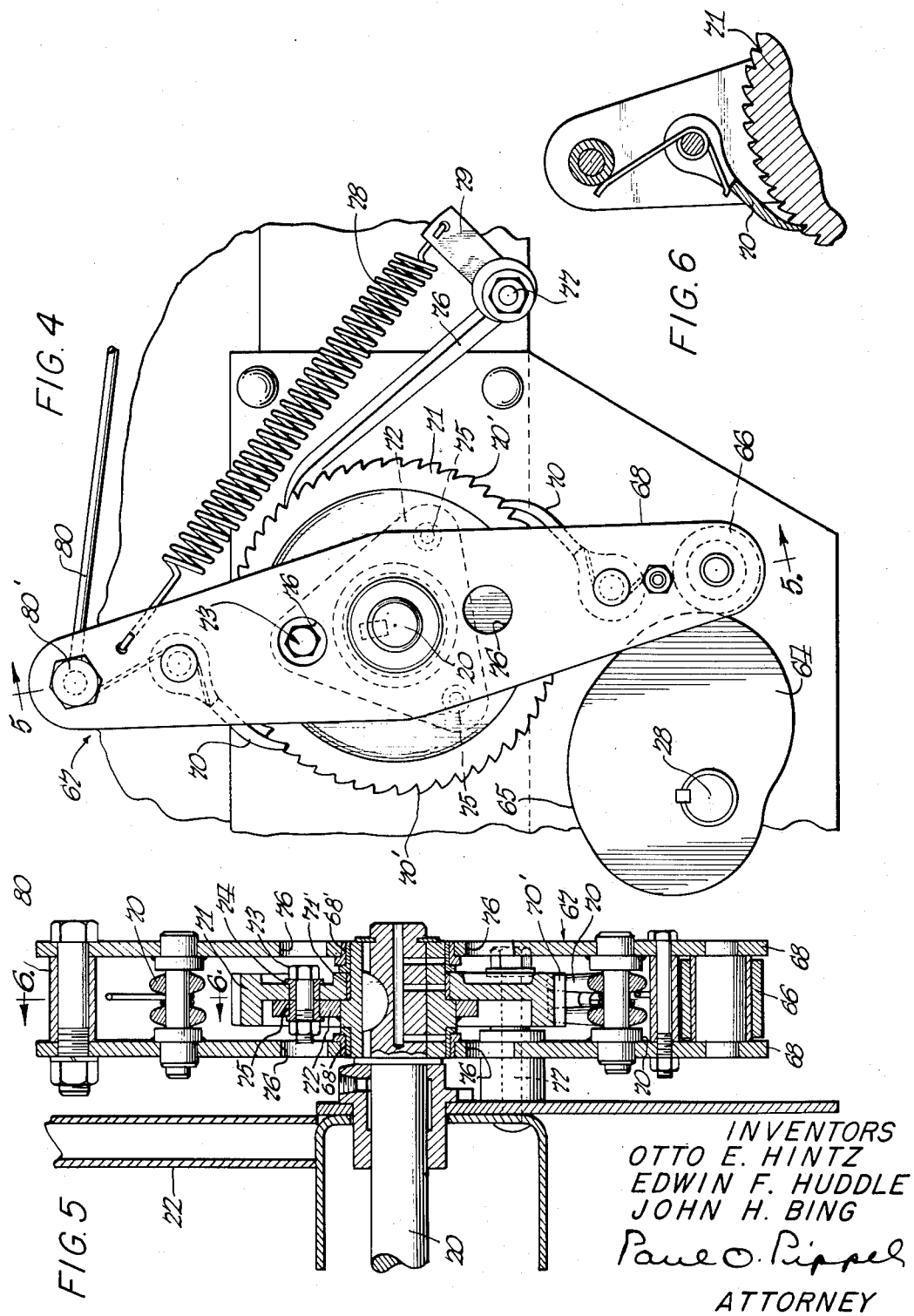

United States Patent Office 2,750,059
Patented June 12, 1956

2,750,059

TWO-WAY SELF-UNLOADING VEHICLE

Otto E. Hintz, Riverside, Edwin F. Huddle, Elmwood Park, and John H. Bing, Downers Grove, Ill., assignors to International Harvester Company, a corporation of New Jersey Application December 15, 1953, Serial No. 398,368

9 Claims. (Cl. 214—519)

This invention relates to self-unloading vehicles.

A general object of the invention is to devise a novel self-unloading wagon incorporating means for unloading the wagon in several directions.

A more specific object of the invention is to devise a novel self-unloading wagon which incorporates a side discharge and a rear end discharge and comprising a plurality of conveyors and driving means therefor so arranged that the same may be mobilized to discharge either through the rear or through the side at the option of the operator.

A further object of the invention is to devise a novel power transmission means featuring a clutch control for mobilizing different portions of the transmission means to route the power to different components of the conveyor means disposed within the wagon box in order to drive these for discharging in one direction or the other.

These and other objects of the invention will become more apparent from the specification and the drawings wherein:

Figure 2 is a fragmentary side elevational view of the wagon;

Figure 3 is a fragmentary isometric view of the drive to the various conveyor components;

Figure 4 is an enlarged side elevational view of the forward power transmission unit for the bed conveyor;

Figure 5 is a vertical cross-sectional view of the structure shown in Figure 4 taken substantially on the line 5—5 of Figure 4;

Figure 6 is a fragmentary sectional view taken substantially on the line 6—6 of Figure 5;

Figure 7 is a side elevational view of the rear transmission unit for the conveyor.

Figure 1:
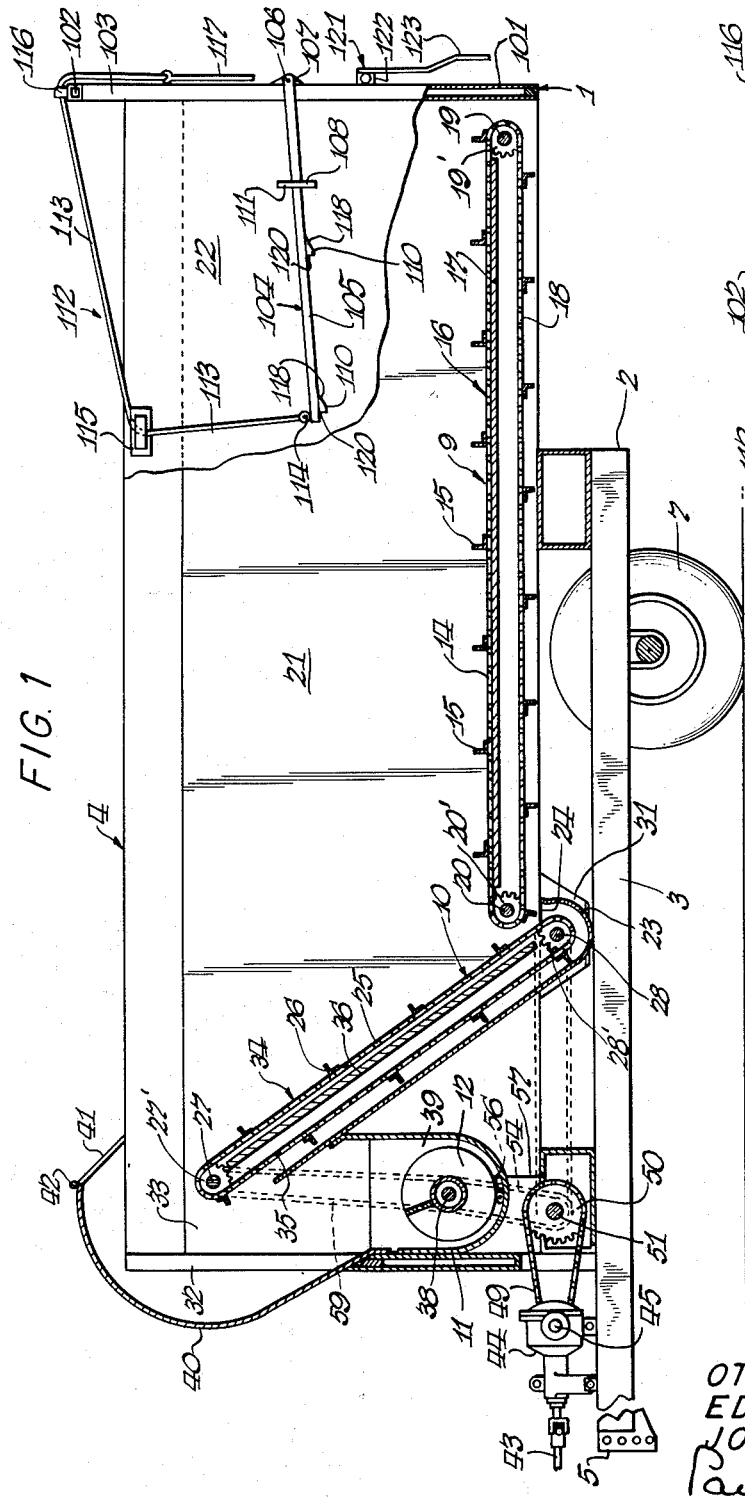
Figure 1 is a composite view partially in vertical longitudinal section and partially in side elevation of a wagon incorporating the invention.
Figure 8:
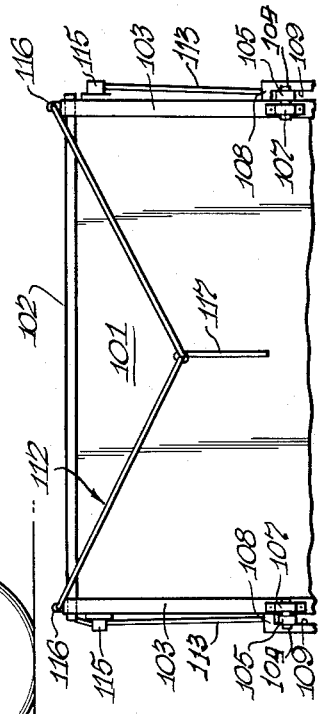
Figure 8 is a fragmentary rear elevational view of the wagon.

Describing the invention in detail, the self-unloading vehicle generally designated 1 is herein shown in the form of a cart comprising a chassis framework 2 including spaced interconnected side sill members 3, 3 converged forwardly of the box or body 4 carried thereby to afford a forward hitch point 5 to an associated tractor (not shown) as will be understood by those skilled in the art.

A supporting wheel and axle assembly 7 is connected to the framework 2 and is located transversely of the box substantially midway between the forward and rear ends thereof.

The wagon discharging means comprises a bed conveyor 9 which discharges toward either the forward or rear end of the box as will hereinafter be described and adjacent to the forward end of the box is disposed a stripper or elevator conveyor 10 which discharges over its upper forward end into a lateral conveyor trough 11 containing an auger conveyor 12 which discharges through an opening 13 in the side of the box 3.

The bed conveyor 9 includes a pair of endless chains 14 (only one being shown in Figure 1) which are disposed at opposite sides of the box and interconnected by cross slats 15, 15, the conveyor 9 providing a top active run 16, disposed over the bottom 17 of the box, and a return run 18 which passes beneath the bottom of the box. The endless apron chains 14 are trained about sprockets 19′ and 20′ keyed respectively on cross shafts 19 and 20 disposed respectively at the rear end of the box and adjacent the intermediate ends of the box forwardly of the wheel and axle assembly 7, the shafts 19 and 20 being rotatively mounted from the side walls 21 and 22 of the box.

The forward end of the box contains the stripper elevator conveyor 10 which extends the width of the box between the sides 21 and 22 and its lower end is disposed in receiving relationship to the discharge end of the bed conveyor within a shallow trough 23 extending beneath the wagon bottom and connected thereto and open to the bottom of the box through a slot 24 formed at the forward terminus of the bed conveyor in the wagon bottom to accommodate the return 18 of the apron beneath the wagon bottom. The stripper conveyor 10 is inclined upwardly forwardly and is of the endless chain type including endless side chains 25 (only one of which is shown) with interconnecting cross-slats 26, 26, the chains 25 being trained about sprockets 27′ and 28′ mounted on the upper and lower cross shaft 27 and 28, the upper shaft 27 being keyed to sprockets 27′ and journalled in the side wall 21 and 22 of the box and the shaft 28 being journalled at opposite ends on depending supports 31, 31 connected to the side sills of the frame work. The sprockets 28′ are rotatively mounted on shaft 28.

It will be understood that the elevator stripper conveyor extends the full width of the box between the sides 21 and 22 thereof and at its bottom end is disposed in receiving relationship to the discharge forward end of the body or bed conveyor or unloading means 9 and inclines upwardly forwardly therefrom and at its upper end is spaced a substantial distance rearwardly from the forward side or end wall 32 of the wagon box or body to provide a discharge space 33 therewith and the adjacent portions of the side walls of the box.

It will be seen that the upper end of the scraper elevator conveyor is driven through the upper shaft assembly 27, 27′. The apron 25, 26 comprises an active or advance run or stretch 34 facing into the box in engaging relationship to the load therein, and the apron 25, 26 comprises a return run 35 facing toward the forward bottom corner of the box. It will be seen from a consideration of Figure 1 that the upper discharge end of the conveyor is slightly below the upper edge of the box.

The upper run 34 of the elevator conveyor passes over a diagonally arranged separator or floor 36 which extends transversely of the box between the side walls 21 and 22 and connected therewith and provides a slide surface for the material which is being carried by said upper run of the elevator conveyor.

The load discharges through the space 33 into the transverse trough 11 which opens upwardly and extends partially under the elevator conveyor in receiving relationship thereto. The trough 11 extends substantially a full width of the box and communicates with the opening 13 in the side of the box through which the load is discharged into a chute 37 which projects laterally outwardly of the side 22 of the box and is connected therewith.

In the trough 11 is disposed the auger 12 which is carried by a shaft 38 journalled in the trough's closed end 39 located at the side 22 of the box.

It will be seen in Figure 1 that the upper discharge end of the scraper elevator conveyor is covered by a forwardly upwardly bowed or transversely curved shield structure 40 which has its lower end connected to the forward wall of the box and projects forwardly therefrom through an opening cut out therein to provide an enlargement of the discharge spaces 33 and this cover shield projects over the upper edge of the box and at its rear edge has a rearwardly extending hinge flap 41 which is hinged to the rear margin 42 of the cover 40 and at opposite ends rests against the upper edges of the sides of the box, and is adapted to be lifted to permit entry into the space 33 for servicing. The purpose of the shield cover is to prevent the material such as ensilage or forage, which is adapted to be blown into the wagon, from piling onto the elevator conveyor and in the space 33 and choking it prior to the wagon being discharged.

The novel transmission for driving the various conveyor components comprises a forwardly extending shaft assembly 43 at the forward end of the wagon and carried by sill members 3, 3, the shaft 43 being adaptable for connection to the power takeoff drive of an associated tractor or to an auxiliary engine (not shown). The shaft 43 connects with a gear box 44 which has stub shafts 45 and 46 at opposite sides extending transversely of the box, the shaft 45 being located on the discharge side of the box and affording a connection to an associated blower mechanism (not shown) in the event that the unloading crop is to be stored in a silo as will be understood by those skilled in the art.

The shaft 46 is provided with a sprocket 48 which drives a chain 49 trained about the sprocket 50 which is keyed to a counter-shaft 51 journalled in bearing carried in the framework of the wagon beneath the trough 34, the counter-shaft 51 extending to the right side of the vehicle (as viewed from the rear) and being keyed to a sprocket 53 which drives a chain 54 which in turn drives a sprocket 55 which is keyed to the extension of the shaft 38 of the auger.

The chain 54 may be associated with an idler sprocket 56 movably mounted on a standard 57 connected to the right side 21 of the box and extending between the shafts 51 and 38 in order to rigidify this area. The shaft 38 is keyed to a sprocket 58 which may drive a chain 59 extending upwardly therefrom and trained about the sprocket 60 keyed to the driving shaft 27 at the upper end of the scraper elevator conveyor.

The counter-shaft 51 is keyed to a sprocket 61 which drives a chain 62 which extends rearwardly therefrom and drives a sprocket 63 keyed to the cam shaft 28 at the lower end of the scraper elevator conveyor. The opposite end of the shaft 28, that is outwardly of the side 22 of the box, may be associated in step by step transmission means 67 (Figure 4) of the variable adjustment type, the transmission means comprising a cam member 64 keyed to the shaft 28 and presenting a driving profile 65 adapted for engagement with a roller 66 rotatably journalled on the lower end of an arm or lever assembly 68, 68 which is pivoted intermediate its ends as at 68' about the shaft 29 which drives the bed conveyor. The arm assembly 68 is provided with a pair of spring biased driving pawls 70, 70 which are urged into engagement with the teeth 70' in the periphery of the rachet wheel 71 rotatably mounted as at 71' on the shaft 20. The shaft 20 is keyed to a clutch member 72 for rotation therewith, and said clutch member 72 is adapted to be connected in driving relationship to the rachet wheel 71 by a clutch means in the form of a nut and bolt assembly 73 which is insertable in registering openings 74, 75 in the rachet and a clutch plate through a registering opening 76, in the lever arms 68. It will be appreciated that when the sprocket 71 and the clutch member 72 are in clutch engaged relationship that rocking of the arm assembly in a counterclockwise direction as seen in Figure 2, pursuant to rotation of the cam 64 will rotate the rachet in a counterclockwise direction and also the shaft assembly 20, 20' thereby moving the top active run of the apron of the bed conveyor to the forward end of the box and effecting the discharge of the load to the scraper elevator conveyor 10. This portion of the operation is shown and described in a copending application filed December 17, 1952, for Self-Unloading Vehicle in the name of Russell R. Raney et al., Serial No. 326,401.

The rachet wheel is also associated with a detent 76 pivoted to the adjacent side rail as at 77 and spring biased into engaging relationship with the teeth of the rachet wheel through the medium of a spring 78 which is under tension between the upper end of the arm assembly 68 and an arm portion 79 of the detent 76. It will be observed from a consideration of Figure 3 that the arm assembly 68 is constantly biased in a clockwise direction in order to engage the roller with the profile of the cam.

The upper end of the arm assembly 68 has a pivotal connection at 80' to one end of an adjustable push-pull rod 80, which has its opposite end pivotally connected to the lower end as at 81 of a second step-by-step transmission generally designated 83 and comprising a pair of side by side arms 84, which intermediate their ends are rotatably mounted as at 85 on the shaft 19 mounting the rear end of the bed conveyor, and between which is rotatably mounted a rachet wheel 86 upon the shaft 19 which also carries a clutch plate 87 keyed thereto, the clutch plate being adapted to be interlocked in driving engagement with the rachet wheel 86 by means of a clutch member in the form of a nut and bolt assembly 88 which is adapted to be connected between the rachet wheel and the clutch plate through either opening 89 or 90 in the arms 84 as will be readily apparent from the consideration of Figure 7. The arms carry a pair of spring pressed pawls 91, 92 which engage with the teeth 86' of the rachet wheel 86 in such a manner that clockwise rotation of the arm assembly 84 will effect clockwise rotation of the rachet wheel 86. Counterclockwise rotation of the rachet wheel is prevented by means of a holding pawl 93 which is pivoted as at 94 intermediate its ends on a bracket 95 adjustably mounted as at 96 on the side sill of the adjacent side 22 of the box and spring biased to engaging relationship to the rachet wheel teeth by means of the tension spring 97. The arm assembly 84 is constantly biased in a counterclockwise direction by means of a tension spring 98 connected at one end as at 99 to the upper end of the arm assembly 84 and at its other end to an upstanding bracket 100 on the adjacent side 22 of the box. It will be understood that the construction of the assembly 84 is substantially identical with that of assembly 67.

The rear end of the box is provide with an endgate 101 which is pivotal at its upper end on a cross bar 102 mounted at each end on an upright standard 103 carried by the related side of the box. The gate extends from the upper edges of the sides to the bottom of the box and spans the space between the sides 21 and 22 and intermediate its upper and lower ends at each lateral edge is provided with a holding bar assembly 104 comprising a forwardly extending rod 105 pivoted at its rear end by a pin 106 on a generally horizontal axis to a bracket 107 secured to the gate 101, the rod projecting intermediate its ends through a keeper bracket 108 which is secured to the adjacent side wall 21 or 22 of the box and provided with a vertical slot 109 to accommodate vertical pivoting of the associated rod on axis 106. The rod 105 is provided with a series of longitudinally spaced detent lugs 110, adapted to catch behind the keeper plate 111 of the related bracket 108, to hold the gate in a plurality of open positions. The vertical elongation of the slot 109 permits triangular lugs 110 to pass therethrough pursuant to raising and lowering of the gate attendant to raising of the bars 105 by the operating assembly 112 which comprises a rope having branches 113 positioned along the walls 21 and 22 and each having one end fastened as at 114 to the forward end of the adjacent rod 105 and passing through an eye member 115 on the related side wall of the box, the member 115 positioned forwardly of the forwardmost extension of rod 105 adjacent to the upper edge of the box. Each branch of the rope then continues rearwardly from eye 115 through an eye 116 on the upper end of the related standard 103 and then along the rear side of the gate and joined to a common depending pull rope portion 117. It will be noted that the lugs 110 are beveled at their lower edges 118 rearwardly to permit the lugs to rise over the lower edge of the slot 109 in rearwardly moving direction of the rods 105 attendant to raising of the gate. However, the forward edges 120 are upright to catch behind the plate 111 to hold the gate raised. Pulling on portion 117 of the rope raises the rods and disengages the lugs 110 to accommodate forward movement of the rods and closing the gate.

The gate is provided with a locking bolt assembly 121 cooperating with sockets 122 on the side walls of the box. The bolt assembly is movable to locked position in the sockets or unlocked position by the pivotally mounted handle 123 which pivotally connects with the bolt assembly.

*Operation of the wagon unloading mechanism*

Assuming that the wagon is loaded, to discharge the load through the side discharge opening 13 (Figure 2), the bolt or clutch assembly 73 is applied to engage ratchet wheel 71 with the plate 72 and the bolt or clutch means 88 is disconnected or disengaged by removing it from plate 87 and ratchet wheel 86. Then drive is transmitted from shaft 43 through gear box 44, shaft 46, chain 49, sprocket 55 to drive auger 12 and from shaft 38 to sprocket 58, chain 59 to sprocket 60 to shaft 27 to drive the elevator conveyor 10 with its top run 34 moving upwardly. The shaft 51 also drives sprocket 61, chain 62, sprocket 63, shaft 28, cam 64 and rocking the transmission assembly 67 which drives the bed conveyor 9 with its top stretch 16 moving forwardly. In the meantime the transmission 83 is in neutral and the arms 84 merely rock back and forth.

To discharge from the rear, the clutch means 73 is disconnected from plate 72 and wheel 71 and clutch means 88 is applied to engage plate 87 and wheel 86 to mobilize the transmission means 83 to deliver power to the shaft assembly 19, 19' for rotating it in a clockwise direction whereby the top stretch 16 of the bed conveyor moves rearwardly attendant to raising or opening of the rear gate. In discharging rearwardly, the chain 54 forming part of the transmission train is disconnected or removed from sprockets 53, 55, thereby immobilizing the elevator conveyor and the auger conveyor.

It will be readily appreciated that a novel, simple and useful arrangement for discharging the wagon in a plurality of directions is provided which functions with equal facility in either direction of operation.

It will be further understood that the design herein shown is merely by way of illustration and that various other forms of the invention within the scope of the appended claims will become readily apparent to those skilled in the art.

What is claimed is:

1. A vehicle including a wheeled frame, a body carried thereby including a bottom, spaced side walls and a front wall and having an open rear end and a discharge opening in one side wall adjacent to said front wall; conveyor means mounted in said body for selectively discharging a load through either said opening or said open rear end and comprising an endless bed coveyor extending over and under said bottom from intermediate the ends of said body to said rear thereof, a pair of shaft elements supporting and drivingly connected to opposite ends of said endless bed conveyor and mounted on said body, an endless elevator conveyor extending upwardly from intermediate the ends of said body to adjacent said forward wall, means including upper and lower shafts journalled from said side walls and supporting opposite ends of said elevator conveyor, means drivingly interconnecting said upper shaft with said elevator conveyor, a side delivery conveyor in said body disposed in receiving relationship to said elevator conveyor and discharging through said side opening; a power driven driving train having a first driving connection to said side delivery conveyor and said upper shaft and having a second driving connection to said lower shaft, a cam on said lower shaft, arms pivoted intermediate their ends on said shaft elements, means on said shaft elements selectively connectible with respective arms in driven relationship thereby for driving respective shaft elements, means drivingly interconnecting said arms, said selectively connectible means on one of said shaft elements being connectible and the selectively connectible means on the other of said shaft elements being simultaneously disconnected to drive said bed conveyor to discharge a load toward said elevator conveyor attendant to said elevator and side delivery conveyors being driven, and said selectively connectible means on said one shaft element being disconnected and said selectively connectible means on the other of said shaft elements being connected to drive said bed conveyor in a direction discharging a load through said rear end attendant to disconnecting said power train second connection to said elevator and side delivery conveyors.

2. In a self-unloading vehicle having a box with a plurality of outlets, conveyor means in said box extending between said outlets for alternatively discharging material therethrough, said conveyor means including a bed conveyor on the bottom of said box and comprising a pair of longitudinally spaced shafts in said box journalled through the sides thereof, an endless apron trained about said shafts, means drivingly interconnecting said shafts and apron, and means for driving the apron in either direction comprising a countershaft journalled on said box adjacent to one of said shafts, a cam secured on said countershaft, an upright arm assembly pivoted intermediate its ends on each shaft, said arm assembly on said one shaft having operative engagement at one end with said cam, a ratchet wheel rotatably mounted on each shaft, a pawl carried by each arm assembly in engagement with the associated ratchet wheel for rotating the latter in direction for advancing said apron in a direction discharging toward respective outlets, clutch means on each shaft and related ratchet wheel, the clutch means on said one shaft engageable with its associated ratchet wheel for driving the one shaft in one direction advancing said apron for discharging the material through one of said outlets, said clutch means on said other shaft mobilizable to connect its associated shaft and ratchet wheel attendant to disengagement of said clutch means on said one shaft for driving said apron in an opposite direction advancing it to discharge material through the other of said outlets, power actuated means drivingly connected with said one shaft, and means drivingly interconnecting said arm assemblies on said shafts.

3. The combination with a vehicle having a wheel supported frame, a body carried by said frame and having first and second spaced discharge openings, a pair of shafts supported one adjacent each opening, an endless conveyor carried by said shafts, drive interconnecting means on said shafts and conveyor; of means for imparting step by step movement to said conveyor toward either discharge opening to unload the same, said means comprising a ratchet wheel rotatably mounted on each shaft, a power driven countershaft adjacent one of said shafts, a cam on said countershaft, an arm pivotally supported on each shaft means interconnecting said arms for simultaneous conjunctive movement in opposite directions, said arm on said one shaft operatively associated with said cam for rocking movement thereby, pawls carried by said arms and engaging respective ratchet wheels, said pawl on the arm pivoted on said one shaft formed and arranged to rotate the associated ratchet wheel in a sense advancing said conveyor to discharge toward said first opening and said pawl on the arm on the other shaft formed and arranged to rotate the associated ratchet wheel in the opposite sense to that of said ratchet wheel on said one shaft, and clutch means between each shaft and related ratchet wheel alternatively engageable to drive the related shaft in the same direction as the associated ratchet wheel.

4. The combination according to claim 3, and said means interconnecting said arms comprising a rod connected to one arm at one side of its axis of pivot and to the other arm at the opposite side of its axis of pivot.

5. The combination according to claim 3, and said arms extending substantially upright and pivoted intermediate their ends on respective shafts and said means interconnecting said arms comprising a rigid member connected to the upper end of one of said arms and to the lower end of the other of said arms.

6. In a drive for an apron conveyor in either of two directions comprising an endless apron, means drivingly supporting opposite ends thereof and including a pair of generally horizontal shafts, a ratchet wheel rotatably carried by each shaft, an upright arm pivoted intermediate its ends on each shaft, a pawl carried by each arm in engagement with the related ratchet wheel for driving the latter in a direction advancing said apron to discharge toward the adjacent end thereof, a clutch plate on each shaft connected thereto for rotation therewith, registering apertures in each clutch plate and related ratchet wheel, a clutch element in the form of a nut and bolt assembly selectively receivable in registering apertures in the ratchet wheel and clutch plate on either shaft at the option of an operator to discharge the apron in either direction, means interconnecting said arms for simultaneous rocking movement in opposite directions, and means driving one of said arms.

7. The combination according to claim 6 and said means interconnecting said arms comprising a rod extending between and connected to the upper end of one of said arms and to the lower end of the other of said arms.

8. In a two way driving device for an apron comprising a pair of laterally spaced generally horizontal shafts disposed in driving relation to opposite ends of the apron, a ratchet rotatably mounted on each shaft, an arm assembly rotatably mounted on each shaft, a pawl connected to each arm assembly in engaging relation to the associated ratchet wheel for driving the same attendant to pendulation of the related arm assembly, means interconnecting said arm assemblies for movement together, and clutch means between each shaft and related ratchet wheel selectively alternatively connectible for transmitting drive from the related ratchet wheel to the associated shaft.

9. The combination according to claim 8 and said arm assemblies pivoted intermediate their ends on respective shafts, and said means interconnecting said arm assemblies at opposite sides of pivot thereof so that said arm assemblies simultaneously pivot in opposite directions.

References Cited in the file of this patent

UNITED STATES PATENTS

| | | |
|---|---|---|
| 865,455 | Travis | Sept. 10, 1907 |
| 981,652 | D'Homergue | Jan. 17, 1911 |
| 1,827,897 | Miller | Oct. 20, 1931 |
| 2,503,129 | Pautz | Apr. 4, 1950 |
| 2,636,400 | Recker | Apr. 28, 1953 |
| 2,641,097 | Mast | June 9, 1953 |
| 2,659,608 | Topp | Nov. 17, 1953 |